United States Patent [19]

Krause

[11] 4,289,296

[45] Sep. 15, 1981

[54] BIDIRECTIONAL AXIALLY PLIANT PRESSURE ASSISTED SEAT FOR A VALVE

[75] Inventor: Bernd Krause, Cincinnati, Ohio

[73] Assignee: Xomox Corporation, Cincinnati, Ohio

[21] Appl. No.: 23,298

[22] Filed: Mar. 23, 1979

[51] Int. Cl.³ .............................................. F16K 1/22
[52] U.S. Cl. .................................... 251/306; 251/173; 251/174; 251/368
[58] Field of Search ................ 251/173, 306, 368, 174

[56] References Cited

U.S. PATENT DOCUMENTS

| | | | |
|---|---|---|---|
| 3,291,444 | 12/1966 | Willis | 251/306 |
| 3,563,510 | 2/1971 | Priese | 251/173 |
| 3,805,828 | 4/1974 | Panagrossi | 251/368 X |
| 4,005,848 | 2/1975 | Eggleston | 251/173 |
| 4,083,529 | 4/1978 | Santy | 251/173 X |
| 4,176,820 | 12/1979 | Broadway | 251/173 X |

FOREIGN PATENT DOCUMENTS

| | | | |
|---|---|---|---|
| 695037 | 9/1964 | Canada | 251/306 |
| 1242960 | 6/1967 | Fed. Rep. of Germany | 251/306 |
| 374257 | 2/1964 | Switzerland | 251/306 |
| 953981 | 4/1964 | United Kingdom | 251/306 |

Primary Examiner—Harold W. Weakley
Attorney, Agent, or Firm—Kinney & Schenk

[57] ABSTRACT

A valve seat especially adapted for a high performance butterfly valve is characterized by flexing axially rather than stretching radially when the seat interfaces with a closure member. In the preferred form, a seat has a support member embedded therein to provide restorative forces which tend to urge the valve seat to a predetermined position in response to axial flexing.

4 Claims, 12 Drawing Figures

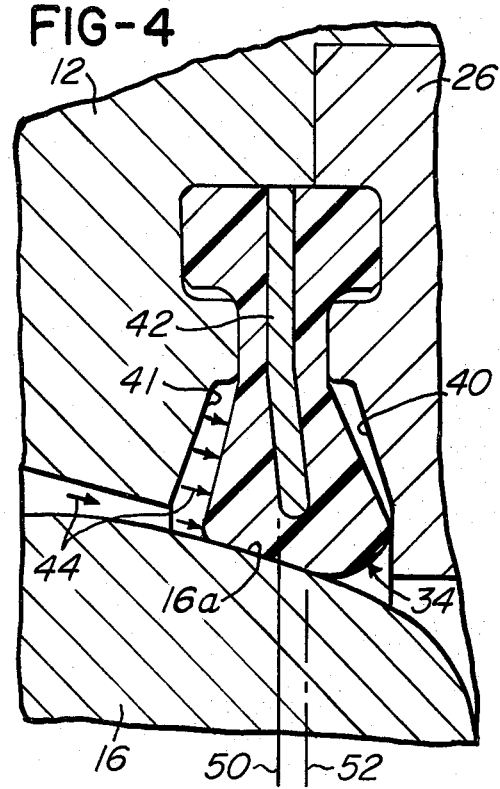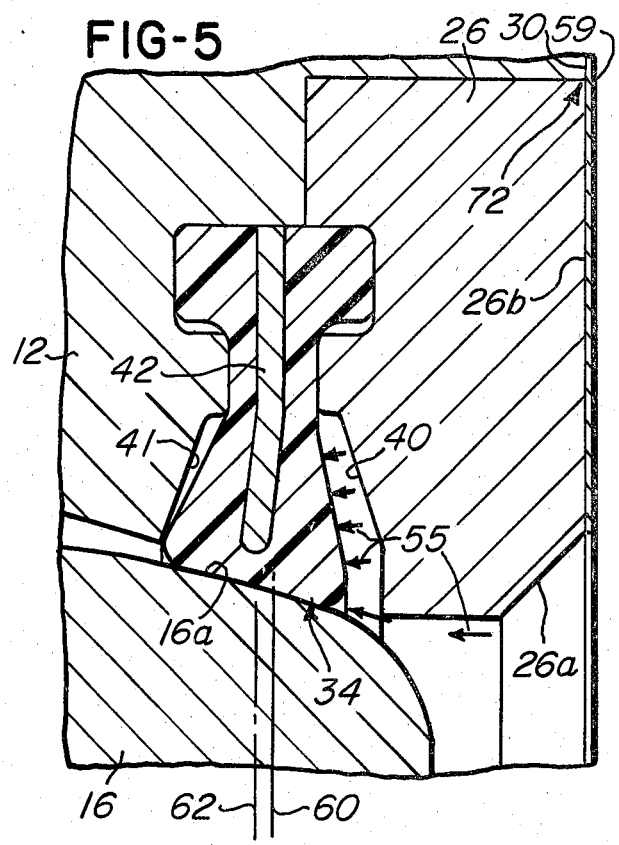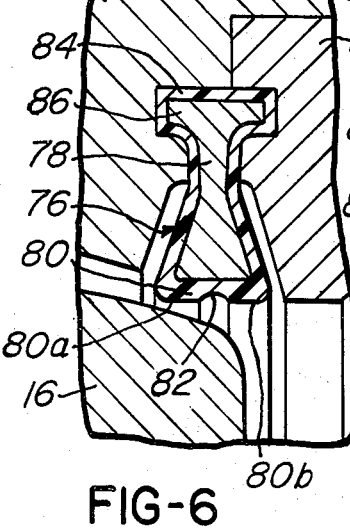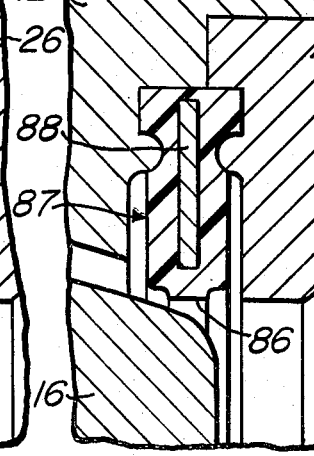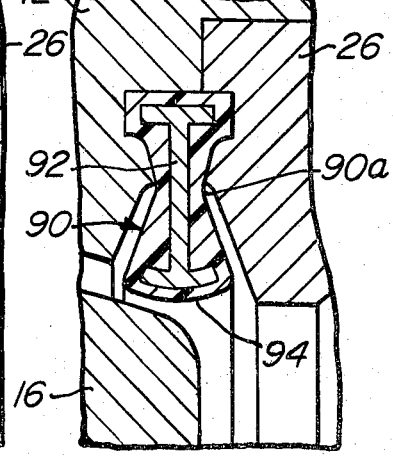

BIDIRECTIONAL AXIALLY PLIANT PRESSURE ASSISTED SEAT FOR A VALVE

BACKGROUND OF THE INVENTION

The invention relates to valves and particularly to a valve seat therein. It will be disclosed, by way of example, in connection with a bidirectional axially pliant pressure assisted seat of a high performance butterfly valve of the type widely used in such diversified applications as chemical processing, power plants, pulp and paper and petrochemical industries. It will readily be appreciated that the valve seat is of general utility, however, and may be used on other types of valves, as for example, ball valves.

Conventional valve seats, as for example, those used on butterfly valves, operate on an interference principle. The disc or closure member interferes with and is forced into the seat member. The closure member is larger than the valve seat so that the two members must be wedged into an interference fit. In a conventional butterfly valve, the seat member is stretched radially to accommodate the larger dimensions of the closure member. However, as the pressures become higher and higher the necessary interference becomes more severe and eventually prevents valve closure.

A number of different approaches have been taken in the prior art to sealingly engage a valve seat with a closure member, all with their attendant disadvantages. One approach is illustrated in U.S. Pat. No. 4,005,848 to Eggleston in which the fluid pressure acting on the valve seat is translated into sliding movement on a conical surface by a metal garter spring. This sliding movement squeezes the seat radially inward against the disc edge. While this seat may be effective in some applications, certain problems with the metal garter spring have been encountered, especially in corrosive applications where the metal garter spring corroded, resulting in leakage across the close valve. Also, under applications with prolonged high pressure, the thin unsupported web or leg of the seat tends to cold flow, that is, take a permanent set or change in shape or dimension when subjected to prolonged stresses. The web is then no longer able to force the seat radially inward against the disc. As a consequence leakage occurs across the closed valve.

Another approach, disclosed in U.S. Pat. No. 3,734,457 to Roos, has been to provide a valve seat with an inside diameter smaller than the disc. In this approach the seat is restrained against radial stretching by a metal hoop, and an interference fit is achieved between the seat and the disc. When the disc is closed, it compresses the seat and at the same time stretches the metal hoop radially.

While this metal hoop approach has been effective in some applications, certain problems have been encountered. For example, in high pressure applications the metal hoop will be subjected to excessive radial stretching due to movement of the disc resulting in permanent deformation of the hoop with subsequent leakage across the closed valve. In addition, since the metal hoop is exposed to media flowing through the valve, it will corrode when used in certain hostile environments. This corrosion results in a seat which is not able to achieve the radial inward compression necessary to effect leak-tight shut-off between the seat and the disc.

Still another prior art approach is described in U.S. Pat. No. 3,563,510, where the valve seat is retained in an annular recess in the valve body. The seat moves into the corner of the recess under the influence of fluid pressure which produces radial inward forces against the disc. This effect is much the same as a standard O-ring would act under pressure. The seat, comprised of a plastic hollow envelopment containing an elastomeric O-ring has proven effective in some applications. Nevertheless, certain problems have been encountered with this approach. The elastomeric O-ring, the primary sealing member of the seat, is subject to chemical attack and swelling by certain chemicals that permeate the plastic hollow envelope causing the inside diameter of the seat to become considerably smaller than the disc, thereby prohibiting the valve from closing fully. Moreover, even when it is possible to close the disc, permanent damage to the seat may result with attendant leakage. Further, in steam service or other elevated temperature service, the elastomeric O-ring will lose elasticity and allow the hollow envelope to deform permanently resulting in leakage across the closed valve.

Still another prior art approach is disclosed in U.S. Pat. No. 3,608,861 and in Canadian Pat. No. 695,037. This last mentioned approach provides a valve seat retained in a valve body recess and rigid annular projection on the valve body side of the annular groove, the projection functioning as a fulcrum to limit flexure under the influence of high pressure to improve valve shut off. While this seat design has also been successful in some applications, its inherent deficiencies have resulted in problems when used in applications where pressure is applied to both sides of the valve. The effectiveness of the valve seat has been limited by its inability to shut off against high pressures entering the valve body side of the valve. Since the disc movement in butterfly valves is not isotropic, the disc is forced further into the seat when the valve is pressurized in the opposite direction. This arrangement causes the all TEFLON seat which is utilized, with its inherent limited elastic memory, to cold flow and permanently deform radially outward, causing leakage across the close valve. Also, the totally unsupported seal depends entirely on the physical strength of the TEFLON material from which it is made. Fillers, such as glass and carbon have been used in an attempt to strengthen the seat. This type of seat strengthening, however, makes the seat very abrasive, creating rapid wear on the disc sealing surface and eventual leaking across the closed valve. The geometry of the solid TEFLON seat is such that under high pressure applications, above 700 p.s.i., the seat cannot follow the disc movement effectively without cold flowing and losing the sealing capability.

Accordingly, it is an object of the present invention to provide an improved valve seat which effectively seals differential fluid pressure in either direction and which compensates axially rather than radially for the movement of the valve disc.

It is another object of the present invention to provide a valve seat with an axially pliant supporting member embedded therein to provide restorative forces whenever the valve seat is flexed axially.

It is a further object of the present invention to provide an effective seal over a wide temperature range for corrosive and noncorrosive media.

It is a further object to provide a valve with extended cycle life and compensation for the effects of thermal expansion or contraction as well as wear of the seat material.

It is still a further object to provide a valve seat with a total encapsulated pliant membrane that is not subject to corrosive, chemical or elevated temperature attack.

A further object of the invention is to provide a valve seat with a relatively narrow central waist section to facilitate axial flexing.

It is yet another object of the present invention to provide a valve seat that is inherently axially pliant and better able to follow anti-isotropic movements of a valve disc.

It is still another object of the present invention to provide a valve seat with an integral pliant membrane which is protected against seal blow-out under high differential pressures and fluid velocities by a wide retaining flange which is substantially larger than its central narrow waist section.

It is still another object of the present invention to provide a valve seat whose axially pliant movement is limited by first and second side walls of an annular groove.

It is still another object of the present invention to provide a valve seat which is symmetrical about a central axis and easily replaced in the field without the possibility of being installed backwards.

Additionally, another object of the present invention is to provide a valve with a movable seat and reinforcing assembly fitted into a groove of the valve capable of aligning itself with other elements of the valve during assembly.

These and other objects and advantages of the invention will be more readily apparent upon reading the following detailed description and upon reference to the accompanying drawings.

SUMMARY OF THE INVENTION

In accordance with the invention, a valve is sealed with a seat member which extends into an opening of the valve body. The seat member cooperatively and selectively interfaces with a movable closure member of the valve and is characterized by axial flexing rather than radial stretching. Preferably, an axially pliant supporting means is embedded within the valve seat member, the supporting means functioning to urge the seat member forward to a predetermined position in response to axial deflections of the seat member.

In a preferred form of the invention, the seat member extends radially inward from an annular recess circumscribing a bore in the valve body and is disposed in radial alignment with a sealing surface of the closure member when a valve is in a closed position. The support means is preferably a continuous membrane and the seat member has a narrow waist portion of reduced axial dimension to enhance flucture in the axial direction.

BRIEF DESCRIPTION OF THE DRAWINGS

In order that the invention may be more clearly understood, the following description is given, merely by way of example, with reference to the accompanying drawings, in which:

FIG. 4 is a sectional view of the valve seat of FIGS. 1-3 illustrating the cooperative relationship of the seat to adjacent elements after fluid pressure has been applied to the body side of the valve.

FIG. 5 is a sectional view of the valve seat of FIGS. 1-4 illustrating the cooperative relationship of the seat to its adjacent elements under the influence of pressure from the retainer side of the valve.

FIG. 6 is a sectional view of an alternate embodiment of a valve seat, supporting structure and adjacent elements.

FIG. 7 is another embodiment of a valve seat which might be utilized in cryogenic or semicryogenic temperature applications.

FIG. 8 is yet another embodiment of a valve seat which provides additional support against cold flowing.

DETAILED DESCRIPTION OF THE PREFERRED EMBODIMENTS

Figure 1:
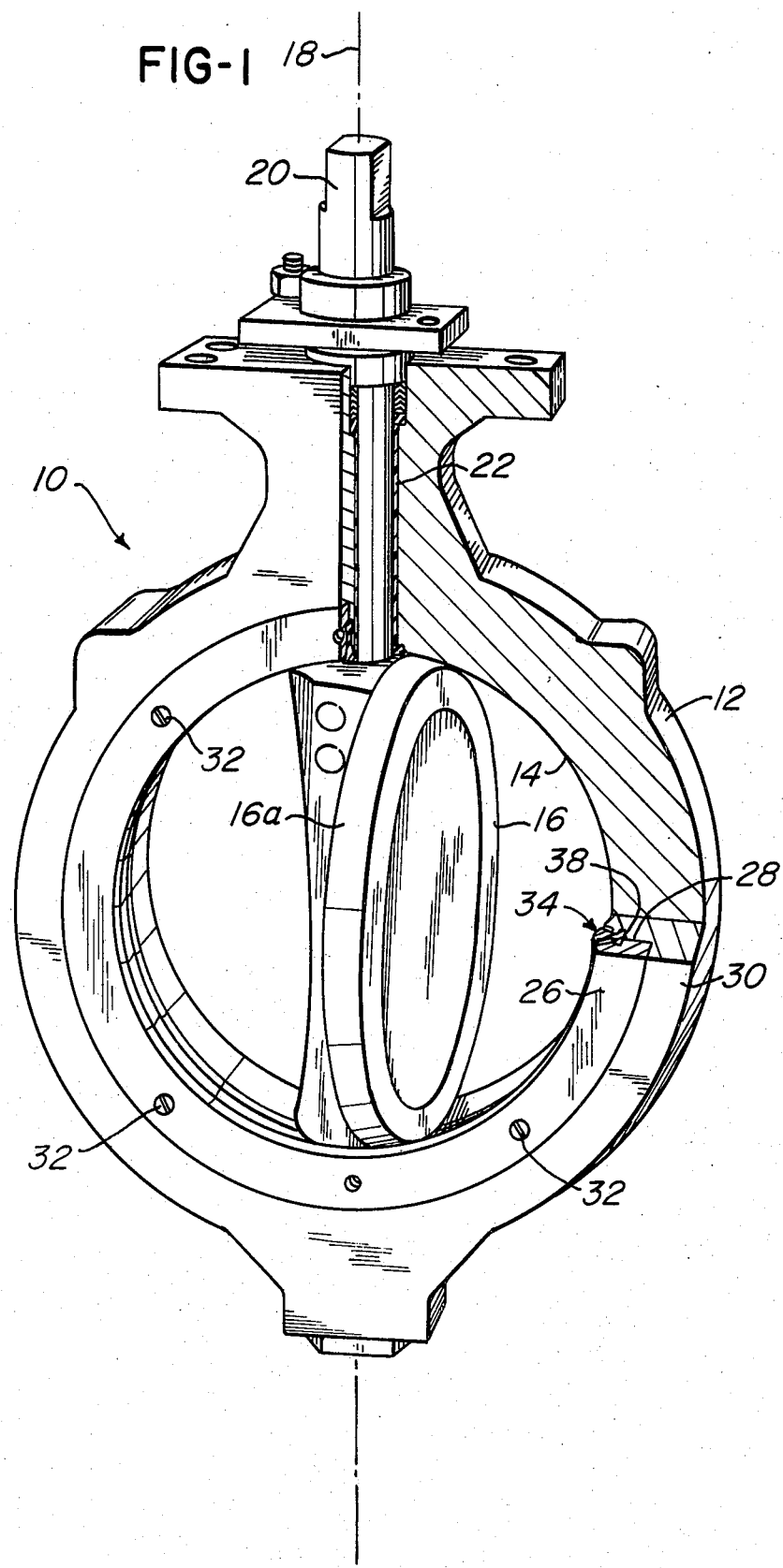
FIG. 1 is a perspective view of a high performance butterfly valve taken from the retainer side of the valve with a portion of the retainer ring removed, illustrating one form of the valve and valve seat of the present invention.

Turning now to the drawings and to FIG. 1 in particular, a butterfly valve designated generally as 10 illustrating one form of the present invention as shown in an open position. The valve 10 has a body 12 of a wafer design which contains a central bore 14. A closure member, shown as a disc 16 with a spherical sealing surface 16a about its periphery, is pivotally mounted in a bore 14 about an axis 18 which is substantially perpendicular to the axis of the bore 14. The disc 16 is pivotally moved to open and close the valve 10. As clearly shown in FIG. 1 and as will be explained in more detail later, the disc 16 is mounted onto the outer surface of a shaft 20 which is rotatable about the axis 18. Since the shaft 20 has a finite diameter, the disc 16 mounted on the shafts outer surface is offset from the axis 18 and eccentrically mounted with respect thereto. The shaft 20 extends completely through the bore 14 and through the body 12. An operator (not shown) is connected to one end of the shaft 20 to impart rotation to both the shaft 20 and disc 16 to close and open openings to the bore 14. Suitable antifriction means such as a sleeve bearing of self lubricated woven-oriented TEFLON contained in a corrosion resistant steel cylinder 22 surround the shaft 20 and reduce friction, reducing the power required of the operator in effectuating rotation of the shaft 20 and disc 16 about the axis 18.

Although not clearly illustrated in FIG. 1, the disc 16 is also eccentrically mounted in a direction perpendicular to the axis 18 so that two eccentricities are present. In other words, the disc 16 is both off-set and eccentric as is well known in the art. This design gives a cam like action to the disc movement as it is pivoted off-center. The off-center disc design moves the disc 16 out of its seat so that the two members do not contact when the disc is in the open position. This design avoids constant scrubbing of the seat, excessive disc drag and seat deformation when the disc is in the open position. This double eccentric design also provides axial movement at the final moment of closure to preload the axially pliant seat of the present invention. Inasmuch as the off-center design is old in the art and forms no part, per se, of the present invention, no further description thereof will be given.

A retainer ring 26 is shown fitted in a recess 28 on the face 30 of the body 12 and is secured by suitable fastening means, as for example, screws 32.

A valve seat member 34 of generally circular configuration is secured into annular groove or recess 38 (more clearly illustrated in FIGS. 2-5) circumscribing the bore 14 and jointly formed by a section of the body 12 and an internal mating surface of the retainer ring 26. As shown in FIG. 1 and as will be explained more fully subsequently in relationship to FIGS. 2-5 (also more clearly illustrated in these FIGS.) the valve seat member 34 extends radially inward from the annular groove 38 toward the radial center of bore 14. The annular recess 38 is in radial alignment with the peripheral sealing surface 16a of the disc 16 when the valve 10 is in the closed position.

Figure 2:
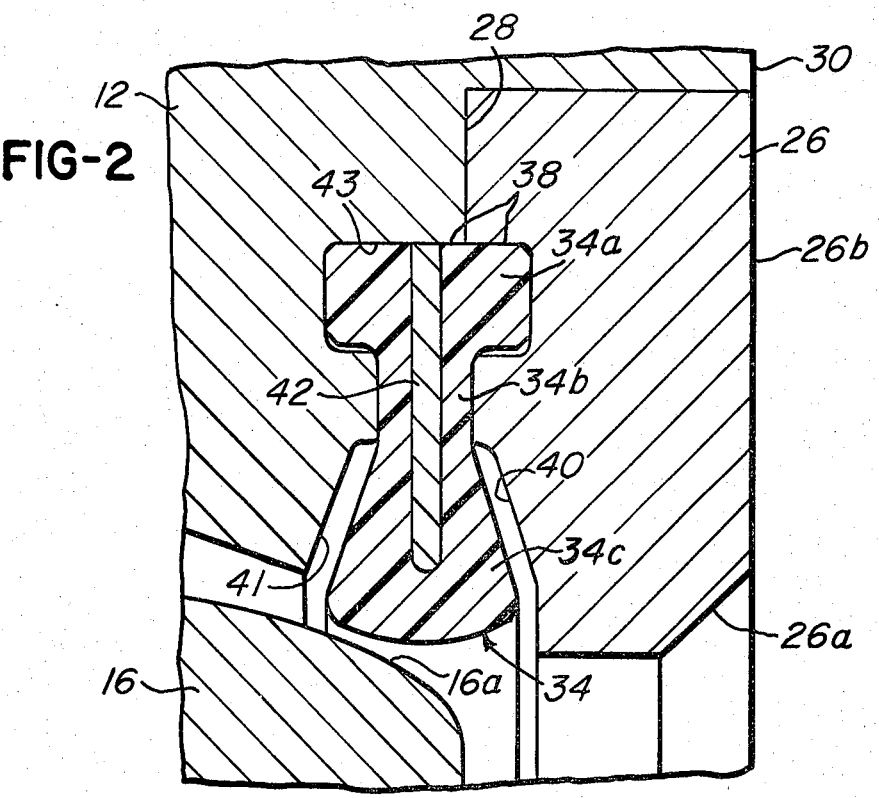
FIG. 2 is a sectional view taken through the valve seat of FIG. 1 and illustrating the valve seat of a preferred embodiment and its adjacent elements.

Turning now to FIG. 2, the seat member 34, retaining ring 26, valve body 12, and closure member 16 of the valve illustrated in FIG. 1 are shown in cross section in greater detail. The seat member 34 has an enlarged portion 34a most distal to the axial center of bore 14. As the seat extends radially inward, it converges to a relatively narrow intermediate waist portion 34b and then diverges to a relatively large portion 34c proximal to the radial center of bore 14. An annular groove 38 is similarly shaped and compressingly engages the seat member at its intermediate portion 34b. Side walls 40 and 41 approximately parallel the side portions of seat portion 34c but are axially spaced therefrom. The side walls 40 and 41 are spaced in accordance to anticipated deflections of the disc 16 under maximum pressure conditions with side wall 40 being spaced between 60 and 70 percent of the total axial disc deflection and side wall 41 being spaced between 30 and 40 percent of the total disc movement. For a 6 inch valve of the type illustrated, side walls 40 and 41 would be spaced approximately 0.023 inch and 0.013 inch respectively.

Also cleary shown in FIG. 2 is a support member 42 which is embedded within the seat member 34. In the particular seat illustrated, the supporting member extends radially inward from an interface 43 of the outer circumferential surface of the groove 38 and the seat 34 to a location beyond the seat's waist portion 34b toward the axial center of bore 14.

The support member 42 is relatively rigid in the radial direction but resiliently pliant in the axial direction. It serves both as a stiffener and as a flexible member. In the preferred embodiment illustrated, the support member 42 is a continuous membrane which encircles the bore 14 with the seat member 34. This pliant membrane uses the resilient forces resulting from axial disc deflection when the disc 16 is in the closed position to provide sealing between the seat and the disc or closure member 16. This is especially true when the disc 16 is under the influence of pressurized fluid. The seat member 34, with its supporting member 42 in the center, is axially pliant and flexes axially at the central waist portion 34b rather than radially when engaged by the disc 16.

In the embodiment illustrated in FIGS. 1-5, the seat member 34 is formed of a fluorinated hydrocarbon polymer, most preferably polytetrafluoroethylene, sold under the Trademark TEFLON (TEFLON is a registered trademark of E. I. DuPont DeNemours, Inc. of Wilmington, Del.). These fluorinated hydrocarbon polymers are used in high performance valves because they are inert to almost all process fluids and are able to withstand higher temperatures and pressure conditions than synthetic rubber materials. They also have a very low coefficient of friction. These polymers unfortunately, however, have a tendency to "cold-flow" and to take a permanent set or change in dimension when subjected to a stress over a long period of time. The support member 42 serves to reduce this tendency and is formed of fiberglass in the preferred embodiment. It is clear, however, that any number of materials might be utilized for construction of the seat or the support member.

Figure 3:
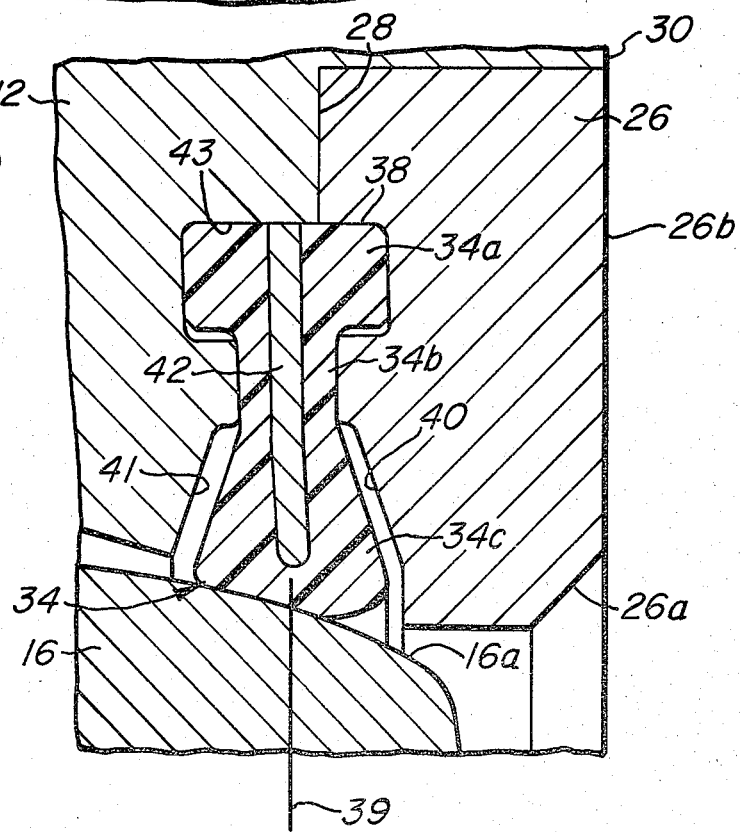
FIG. 3 is a sectional view of the seat of FIG. 2 but showing the seat and closure member in a preload sealing relationship.

In FIG. 3, the valve seat of FIG. 1 is shown in a preload sealing relationship with spherical sealing surface 16a of disc 16. This illustration depicts the disc closed to the fullest extent provided solely by the mechanical movement of the valve operator. It is noted that the most radially inward portion of the seat material 34 is deformed under the influence of the engagement and that the pliant support member 42 is slightly flexed at the waist portion 34b of the seat 34. The pliant membrane 42 acts with the TEFLON seating material to provide restorative forces tending to return the seat to its original position once the axial forces are terminated. A line 41 represents the centerline of the pliant membrane in this position. The major flexing motion is axial rather than radial.

FIG. 4 shows the valve seat 34 of FIG. 3 after the disc 16 has moved forward under the influence of fluid pressure in the direction of arrows 44 from the body side of the valve 10. As apparent from the illustration, the seat member 34 is pressure activated and has moved against the side wall 40. The pliant supporting member 42 is also flexed to an even greater extent than that shown in FIG. 3. It is also seen that the side wall 40 cooperates with the seat member 34 to restrict axial movement thereof. The side wall 40 (as well as side wall in the opposite axial direction) thus functions to keep the seat 34 from moving out of contact with the disc 16 when under the influence of high pressure. Those portions of annular groove 38 adjacent to side walls 40 and 41 also cooperatively interact with the seat 34. The compressive engagement of the seat's intermediate waist portion 34b by those portions serve to focus the seat's flexure at that location.

Lines 50 and 52 depict the amount of axial deflection experienced by the seat 34, the former line 50 representing the axial position of the centerline of the seat 34 in the preload state of FIG. 3 and the latter line 52 representing the axial position of the same centerline after deflection imparted by the fluid pressure from the body side of the valve 10 in the direction of arrows 44.

The axial displacement of the disc 16 shown in FIG. 4 produces axial displacement of the seat 34 and represents two components. First, it represents the clearances between the shaft 20, the disc 16, the bushing and the body 12. Second, it also represents deflections of the disc 16 and the shaft 20 resulting from the high pressure which move it forward. The total movement of the preferred embodiment with a six inch bore would be approximately 0.023 of an inch in this direction.

The seat 34 follows the axial displacement of the disc 16. The illustrated seat easily flexes axially at its waist portion 34b to accommodate a larger diameter on the sealing surface 16a, sealing surface 16a being in the form of a spherical sector. The present invention is characterized by this axial flexing which also prevents radial stretching which is prevalent in the prior art. The axial deflection also assists in returning the valve seat to its original shape rather than being permanently deformed and stretched.

The TEFLON seat material used in the preferred embodiment lacks the memory to return to its original position. The pilant membrane 42 is thus used to act upon the seat material to give it continuous restorative forces.

Fluid pressure on the retainer side of the valve 10 acting on the disc 16 (in the direction of arrows 55) is shown in FIG. 5. The preload axial position (of FIG. 3) of the valve seat is represented by a line 60 while a line 62 represents the axial position of the seat under the influence of the retainer side pressure acting in the direction of arrows 55. It is noted that the deflection of this direction is less than the corresponding deflection distance in the other axial direction. For a six inch valve of the type illustrated, this movement would be approximately 0.013 of an inch. This disparity results because the disc 16 when in the preload close position, has already taken up all the clearance between the various mating parts. The only movement in this direction (represented by arrows 55) results from the deflection of the disc which illustrates that the movement is not isotropic. The sealing surface 16a of the disc 16 of the preferred embodiment is in the form of a spherical sector and thus the fluid pressure in the direction of arrows 55 tend to move the disc 16 away from the seat 34. If the seat 34 were not pressure activated and flexed to follow it, the sealing relationship would be lost. The pliant membrane 42, however, allows the seat member 34 to move axially and to follow the disc 16 remaining in sealing contact with it. It is thus seen that the seat member 34 is bidirectional, the sealing action takes place in both directions. The pliant member 42 can be readily flexed at its narrow waist portion 34b in either axial direction to facilitate axial deflection.

FIGS. 2-5 also show that the seat 34 and supporting membrane 42 are symmetrical about the center line running through the center of membrane 42. In addition to contributing to the valve seat's bidirectional characteristics, the symmetrical structure eliminates possible inadvertent backwards positioning when a new replacement seal is inserted in the field. The seal of the preferred embodiment may be installed in either direction, and it is not possible to position it backwards.

In carrying out the invention, the side wall 40 of the retaining ring 26 of the preferred embodiment extends radially downward so as to protect the seat 34 from direct force impingement and errosion by the media. The retaining ring 26 has a beveled edge 26a which assists in this regard as seen, for example, in FIG. 5.

In accordance to a further aspect of the invention and as seen in FIG. 1 and FIG. 5, the retainer ring 26 is recessed into the body 12 such that its outermost surface 26b lies in a common plane with the outermost surface 12a of the valve body 12. Such an arrangement prevents exterior valve leakage by having the exterior leak path covered by a mating flange gasket 59 as shown in FIG. 5 where the exterior leak path is covered by the gasket 59 at location 72.

It should be apparent that many alternate embodiments of seals using the present invention are possible. Some exemplary alternate embodiments are illustrated in FIGS. 6-11.

In FIG. 6, an embodiment with more axial rigidity is illustrated. This embodiment allows even less cold-flowing than the preferred embodiment of FIGS. 1-5 and might be used in applications where even greater pressures are present. Both the seating member 76 and support member 78 are generally X-shaped with a diverging portion approximate to the sealing surface 80. The sealing surface 80 is bifurcated into subsurfaces 80a and 80b with a depression 82 therebetween. The depression 82 isolates the sealing surfaces 80a and 80b from each other to make them independent. The most radial outward portions 84 and 86 of the X-shaped seating member 76 and support member 78 respectively are enlarged with axial flanges to accommodate the higher fluid velocities which accompany high pressure fluid flow. This construction also assists in preventing the seat from being extruded outwardly and being expelled from the annular groove under high fluid velocities and pressures.

FIG. 7 illustrates an alternate embodiment of a seat valve which is similar to the embodiments of FIGS. 1-5 but with a narrow sealing surface 86 of a valve seat member 87. The narrow sealing surface 86 may be desirable in cryogenic or semicryogenic temperature applications to reduce torque requirements necessary to open and close the disc. The FIG. 7 embodiment also differs from FIGS. 1-5 in that it has a support member 88 which is totally encapsulated within the seat member 87.

FIG. 8 illustrates an embodiment which is a variation of FIG. 6 in that both the seat member 90 and pliant member 92 are enlarged and extending in the axial direction at their most radially inward and most radially outward portions. This construction provides additional support against cold-flowing. Unlike the embodiment of FIG. 6, however, the FIG. 8 embodiment has a single sealing surface 94 which is similar to the embodiments of FIGS. 1-5. Again the central waist portion 90a of the seat member 90 is reduced in its axial dimension to facilitate axial flexing at that location.

Figure 9:
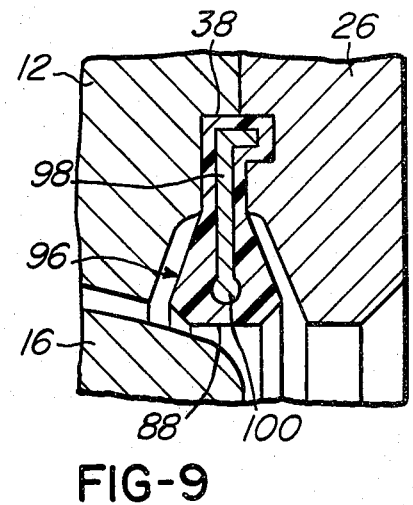
FIG. 9 is a further embodiment of a valve seat of the present invention.

In FIG. 9 another variation, a valve seat member, is illustrated. In this embodiment both the seat member 96 and supporting member 98 embedded therein are L-shaped at their most radially outward portions, and this portion of the seat is secured within the annular groove 38. The most radially inward portion of the support member 98 forms a bulbous like structure 100 which may serve to provide a relatively blunt interface between the support member and seating member so as to minimize any cutting action on the seating material. This embodiment has a wide contact area 88 which is relieved on both sides to allow the disc to engage the seat without "grabbing" it at the edge and to insure that it will not "pull" the seat.

Figure 10:
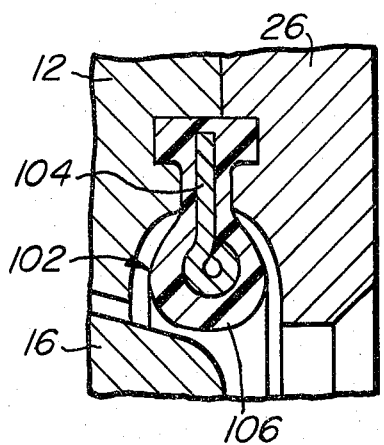
FIG. 10 is yet another embodiment of the valve seat of the present invention.

Still another variation shown as seat member 102 is illustrated in FIG. 10 in which the supporting membrane or pliant member 104 is made of a metallic material curled or rolled at its most radially inward portion 106. Again it is noted that the seating material has a reduced axial dimension at its central waist portion to once again facilitate axial flexing at that location.

Figure 11:
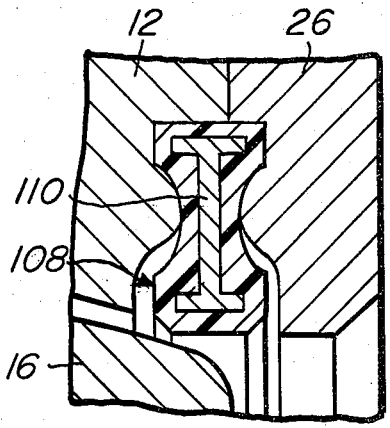
FIG. 11 is still another embodiment of the valve seat of the present invention.

Both the seating material 108 and the supporting structure 110 have an I-shape in the embodiment of FIG. 11. This configuration makes the pliant membrane 110 more rigid and gives it different flexing capabilities.

The annular groove 38 in the valve 10 must be machined concentric to the disc 16. In most applications, the relative flexibility of the valve seat provides some forgiveness in this regard and partially reduces the criticality of machining the groove concentric and round. In some applications, however, these machining tolerances become more critical. One such example is when the valve is used in cryogenic environments. Extremely low temperatures cause the valve seat materials to become very rigid. In these applications, it is much more important that the groove and disc be aligned precisely as any misalignment will substantially increase the torque demands placed upon the valve operator.

Figure 12:
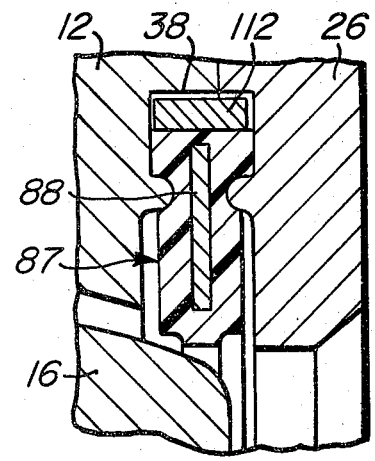
FIG. 12 is an embodiment similar to the seat illustrated in FIG. 7 with the addition of a centering ring.

FIG. 12 illustrates an embodiment which is designed to reduce the machining tolerance requirements of the groove 38. This embodiment is similar to the embodiment of FIG. 7 except that the groove 38 has been enlarged, and a reinforcing member shown as a centering ring 112 interfaces with the outer circumferential surface of the seat. The centering ring 112 is preferably, but not necessarily, formed of the same material as the valve body. In the preferred embodiment both the valve body and centering ring are formed of stainless steel.

As illustrated in FIG. 12, the centering ring 112 has a dimension in the axial direction which is less than the outermost circumferential surface of the seat. Axial clearances between the sides of the centering ring and the side walls of the annular groove 38 are thus present. These side clearances insure that the sealing relationship between the seat, valve body and retainer ring will not be impared. Further, a clearance between the circumferential surface of groove 38 and the centering ring 112 allows for radial shifting of the entire assembly of the seat and centering ring.

The centering ring 112 and the seat with which it firmly interfaces, are placed in the annular groove during initial assembly. The clearance between the circumferential surface of groove 38 and the centering ring 112 allows both the seat and the centering ring to shift and find their own center relative to the disc. Once this center position is achieved, the retainer ring 26 clamps and sealingly engages the seat member, fixing the position of the seat and centering ring relative to the valve body. After the retainer ring 26 is assembled, the centering ring 112 functions in a manner analogous to that of the annular groove 38 in the earlier described embodiments and prevents radial cold flow of the seat material.

Other preferred seat materials for the embodiment of FIG. 12 would include KEL-F plastic, a homopolymer of chlorotrifluorethylene (KEL-F is a Trademark of the 3M Company of Minneapolis, Minn.) or a ultrahigh molecular weight polyethylene (UHMWP). These materials could also be used for the seats of the embodiments of FIGS. 1-11. This list of materials is not exclusive, however, and many additional materials will be readily apparent to those skilled in the art.

Thus it is apparent that there has been provided in accordance with the invention a valve and seat member therefor which satisfies the objects, aims and advantages set forth above. While the invention has been described in conjunction with specific embodiments thereof, it is evident that many alterations, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A butterfly valve with a pressure assisted seat member, which comprises:

(a) a valve body having a central bore therethrough;

(b) a disc member mounted in said bore and movable between an open and closed position about an axis transverse to said bore and having a peripheral sealing surface;

(c) an annular recess circumscribing said bore and disposed in radial alignment with said sealing surface of said disc member when said disc member is closed;

(d) a symmetrical seat member formed of a fluorinated hydrocarbon polymer supported in and extending radially inward from said annular recess to selectively and sealingly interface with said sealing surface on said disc member, said seat member including:

(i) a first portion secured within said annular recess;

(ii) a second portion disposed radially inward with respect to said first portion and having an axial dimension which is smaller than the axial dimension of said first portion;

(iii) a third portion disposed radially inward with respect to said second portion and having an axial dimension which is greater than the axial dimension of said second portion;

(e) means for compressingly engaging the second portion of said seat member, said seat member cooperating with said disc member to axially flex the seat member at the second portion, said engaging means serving to concentrate axial flexure at that location;

(f) a continuous support membrane within said seat extending radially inward from said first portion of said seat member into said third portion of said seat member, said support membrane having a dimension in the radial direction which is greater than its axial dimension and being axially pliant to urge the seat member to a predetermined position in response to axial deflections; and (g) side walls extending radially inward from said annular recess which are proximate to said seat but axially spaced from the third portion thereof, said side walls being operative to limit axial movement of said seat.

2. A butterfly valve with a pressure assisted seat member, which comprises:

(a) a valve body having a central bore therethrough;

(b) a disc member mounted in said bore and movable between an open and closed position about an axis transverse to said bore and having a peripheral sealing surface;

(c) an annular recess circumscribing said bore and disposed in radial alignment with said sealing surface of said disc member when said disc member is closed;

(d) a seat member supported in and extending radially inward from said annular recess to selectively and sealingly interface with said sealing surface on said disc member, said seat member including:

(i) a first portion secured within said annular recess;

(ii) a second portion disposed radially inward with respect to said first portion and having an axial dimension which is smaller than the axial dimension of said first portion;

(iii) a third portion disposed radially inward with respect to said second portion and having an axial dimension which is greater than the axial dimension of said second portion;

(e) a continuous support membrane within said seat member extending radially inward from said first portion of said seat member into said third portion of said seat member, said support membrane having a dimension in the radial direction which is greater than its axial dimension and being axially pliant to urge the seat member to a predetermined position in response to axial deflections; and (f) side walls extending radially inward from said annular recess which are proximate to said seat but axially spaced from the third portion thereof, said side walls being operative to limit axial movement of said seat.

3. A valve seal comprising, in combination:
(a) a valve body defining an axial flow passageway;
(b) a closure member mounted in the valve body to selectively block and unblock the passageway, said closure member having a peripheral sealing surface;
(c) groove means in the valve body communicating with the passageway and disposed in radial alignment with the peripheral sealing surface of the closure member when it is positioned to block the passageway; and
(d) a seat member fitted within said groove means and interfacing with said closure member, said seat member including:
  (i) a first portion secured within said annular recess;
  (ii) a second portion disposed radially inward with respect to said first portion and having an axial dimension which is smaller than the axial dimension of said first portion, said second portion being compressingly engaged by said groove means;
  (iii) a third portion disposed radially inward with respect to said second portion and having an axial dimension which is greater than the axial dimension of said second portion, said third portion being adapted to selectively interface with said closure member; said seat member being axially flexible at said second portion in response to forces resulting from interfacing with said closure member; and
(e) support means within said seat member and extending from said second portion to said third portion for providing restorative forces tending to urge said seat member to a predetermined position in response to axial deflections.

4. A valve seal as recited in claim 3 further including side walls on each axial side of said seat member extending radially inward from that portion of said groove means which compressingly engages said second portion of said seat, said side walls being operative to define limits of axial seat member movement, one of the side walls being spaced to permit between 60 and 70 percent of the seat member's movement from a first axial direction from a preload position of the seat member and the other side wall being spaced to permit between 30 to 40 percent of the movement in a second axial direction from the preload position.

* * * * *